United States Patent [19]

Toyomura

[11] Patent Number: 4,774,684

[45] Date of Patent: Sep. 27, 1988

[54] ELECTRONIC APPARATUS WITH A DISPLAY MEANS

[75] Inventor: Shigeru Toyomura, Yokohama, Japan

[73] Assignee: Canon Kabushiki Kaisha, Tokyo, Japan

[21] Appl. No.: 823,352

[22] Filed: Jan. 27, 1986

[30] Foreign Application Priority Data

| | | | |
|---|---|---|---|
| Jan. 31, 1985 | [JP] | Japan | 60-15458 |
| Jan. 31, 1985 | [JP] | Japan | 60-15459 |
| Jan. 31, 1985 | [JP] | Japan | 60-15460 |
| Jan. 31, 1985 | [JP] | Japan | 60-15461 |

[51] Int. Cl.[4] .......... G06F 3/14

[52] U.S. Cl. .......... 364/710.08; 364/710.11

[58] Field of Search .......... 364/710; 340/711, 712

[56] References Cited

U.S. PATENT DOCUMENTS

| | | | |
|---|---|---|---|
| 4,093,992 | 6/1978 | Kawamura et al. | 364/710 |
| 4,095,046 | 6/1978 | Frutiger et al. | 340/711 |
| 4,120,040 | 10/1978 | Aihara | 364/710 |
| 4,317,106 | 2/1982 | Hüber | 340/711 |
| 4,379,640 | 4/1983 | Inoue | 364/710 |
| 4,410,795 | 10/1983 | Ueda | 340/711 |
| 4,504,826 | 3/1985 | Leininger | 340/711 |
| 4,543,631 | 9/1985 | Korosu et al. | 340/711 |
| 4,573,134 | 2/1986 | Ikemoto | 364/710 |

OTHER PUBLICATIONS

Farish et al., *Personal Programming A Complete Owner's Manual for TI Programmable 58C/59,* Texas Instruments, Dallas, Tex., pp. V-1, V-5-V9, V-22-V-23, V42-V45, 1977.

*Primary Examiner*—Gary V. Harkcom
*Assistant Examiner*—Dale M. Shaw
*Attorney, Agent, or Firm*—Spencer & Frank

[57] ABSTRACT

An electronic apparatus such as an electronic desk-top calculator, word-processor or electronic typewriter having a display unit and a data input keyboard with plural operating modes in which one of a mode display format and a regular display format is selectively displayed on the single display unit. This arrangement provides a low-cost electronic apparatus using a general-purpose display. The display may return automatically to a regular display after a predetermined period of time has elapsed following a mode display, thereby providing a convenient electronic apparatus without excessive operations.

14 Claims, 5 Drawing Sheets

FIG. 4

| Step NO. | Key Operation | D11 | D10 | D9 | D8 | D7 | D6 | D5 | D4 | D3 | D2 | D1 |
|---|---|---|---|---|---|---|---|---|---|---|---|---|
| | | | | | PRT | | + | 3 | 2 | 0 | F | 5/4 |
| 1 | Power on Reset | | | | — | | | | | | — | — |
| 2 | | | | | | | | | | | | 0. |
| 3 | ON MODE | | | | — | | | | | | — | — |
| 4 | ↑ PRT | | | | | | | | | | — | — |
| 5 | TAB | | | | | | | | | — | | — |
| 6 | TAB | | | | | | | | — | | | — |
| 7 | | | | | | | | | | | | 0. |
| 8 | OFF | | | | | | | | | | | |
| 9 | ON MODE | | | | | | | | — | | | — |
| 10 | (Keep pressing) ↑ PRT | | | | — | | | | — | | | — |
| 11 | 5 | | | | | | | | | | | 5 |
| 12 | ↑ PRT | | | | | | | | | | | 5. |
| 13 | TAB | | | | | | | | | | | 5. |
| 14 | 5/4 | | | | | | | | | | | 5. |
| 15 | ON MODE | | | | — | | | | — | | | — |

a b c d e f d f d a g c d

ELECTRONIC APPARATUS WITH A DISPLAY MEANS

BACKGROUND OF THE INVENTION

1. Field of the Invention

The present invention relates to an electronic apparatus that can be operated in a selected mode of a plurality of operating modes, and more particularly to an electronic apparatus such as an electronic desk-top calculator, word-processor or electronic typewriter having a display unit and a data input unit and which can be operated by selecting a desired operating mode.

2. Description of the Prior Art

As an example of this type of electronic apparatus an explanation will be made of an electronic desk-top calculator. The principal components of LSIs and a display unit in such an apparatus can be classified as follows.

In the first group, a PMOS type LSI is used and a fluorescent display tube is used as the display unit.

In the second group, a CMOS LSI is used and a liquid crystal display is used as the display unit.

The combination in the first group has the disadvantage that both the LSIs and the display unit consume a large amount of electrical power, but has the advantage that the display is very easily read. On the other hand, the combination in the second group has the advantage that both the electrical power consumption by the LSIs and the display unit is very low, but has the disadvantage that the display is hard to read Furthermore, in order to set various modes, an electronic desk-top calculator according to the combination in the first group has various mechanical switches in order to specify modes such as rounding to the nearest whole number, inserting a decimal point or printing so that the mode setting does not change even when the power supply is turned off. On the other hand, a low-priced calculator according to the combination in the second group has special mode display symbols in a portion of the display unit which is different from the data display portion, and mode setting is performed by specifying a desired symbol by a touch-key. Furthermore, the use of a CMOS LSI which has low power consumption means that the set mode is stored when operation is interrupted by pressing an OFF key, so that the mode setting once made does not change.

In recent years, advances in semiconductor technologies have led to the commercial availability of CMOS LSIs with high-voltage resistance specifications. As a result, a third combination is becoming possible in which CMOS LSIs are used together with a fluorescent display tube used in the display unit.

This third combination requires, however, the provision of special mode display symbols, leading to the disadvantages of a complicated arrangement in the display unit and accordingly a high cost.

Apart from the above-mentioned problems, in recent years the number of functions which can be executed by this type of electronic apparatus has increased dramatically. An electronic desk-top calculator, for instance, has a number of different operating modes relating to calculations and display, and a large number of keys are required so as to specify those modes.

In opposition to the increase in size of such keyboards, however, the advances in LSI have resulted in that the overall size of the main unit of such apparatuses has become compact.

This leads to the disadvantage that the number of keys to be pressed has increased dramatically, so that operability has been decreased.

SUMMARY OF THE INVENTION

It is, therefore, an object of the present invention to provide an electronic apparatus which can display a plurality of modes using a single display unit, and which has a low-cost arrangement.

It is another object of the present invention to provide an electronic apparatus which can execute a large number of functions and/or operating modes without increasing the number of keys on a keyboard.

In the first aspect of the present invention, an electronic apparatus with a display means and having a plurality of operating modes, comprises:

means for selecting either one of an operating mode display format and the remaining display format; and means responsive to an output from the mode selecting means for setting the display format of the display means to the selected display format.

Here, the display means may have seven segmental display elements and performs the operating mode display by displaying at least one predetermined segment of the display elements. The mode selecting means may have a mode selecting key, and the electronic apparatus may comprise means for controlling the display format setting means to interrupt the operating mode display format when a key other than the mode selecting key may be pressed while the operating mode may be displaying. The mode selecting means may comprise means for nullifying a pressing of the mode selecting key at a time other than when the display means may be displaying the operating mode of the operating mode format. The mode selecting key may also function as an electric power supply on key, and the electronic apparatus may further comprise means for using an output from the key as the mode selecting key output only after the electric power supply is on.

The electronic apparatus may further comprise means for controlling the display means to clear the content of an operating mode displayed on the display means after an elapse of a predetermined time, and to change the format of the operating mode displayed to the remaining display format.

In the second aspect of the present invention, an electronic apparatus with a display means and having a plurality of operating modes, comprises:

means for switching the display means between an operating mode display format and the remaining display format;

means for detecting when a power supply may be turned on or when the display means may be reset; and means responsive to an output from the detecting means for controlling the display means to set forcibly a display format of the display means to an operating mode display format.

Here, the switching means may comprise means for automatically switching to the remaining display format from the operating mode display format after performing the display according to the operating mode display format for a predetermined period of time. The control means may have a mode setting key and the electronic apparatus may further comprise means responsive to a pressing of the mode setting key only when an operating mode display format may be displayed on the display means, for setting the electronic apparatus to a specified operating mode condition.

In the third aspect of the present invention, an electronic apparatus with a display means comprises:

an operating mode setting key; and means for providing the operating mode setting key with a function other than mode setting when the operating mode setting key may be energized under a predetermined condition.

The operating mode setting key may be a print mode specifying key and the function providing means may have means for serving the print mode specifying key as a paper feed key at a time other than when an operating mode can be specified.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 4 is a table showing relationships between key operations used in the embodiment and details of the resulting displays.

DETAILED DESCRIPTION OF PREFERRED EMBODIMENTS

Figure 1:
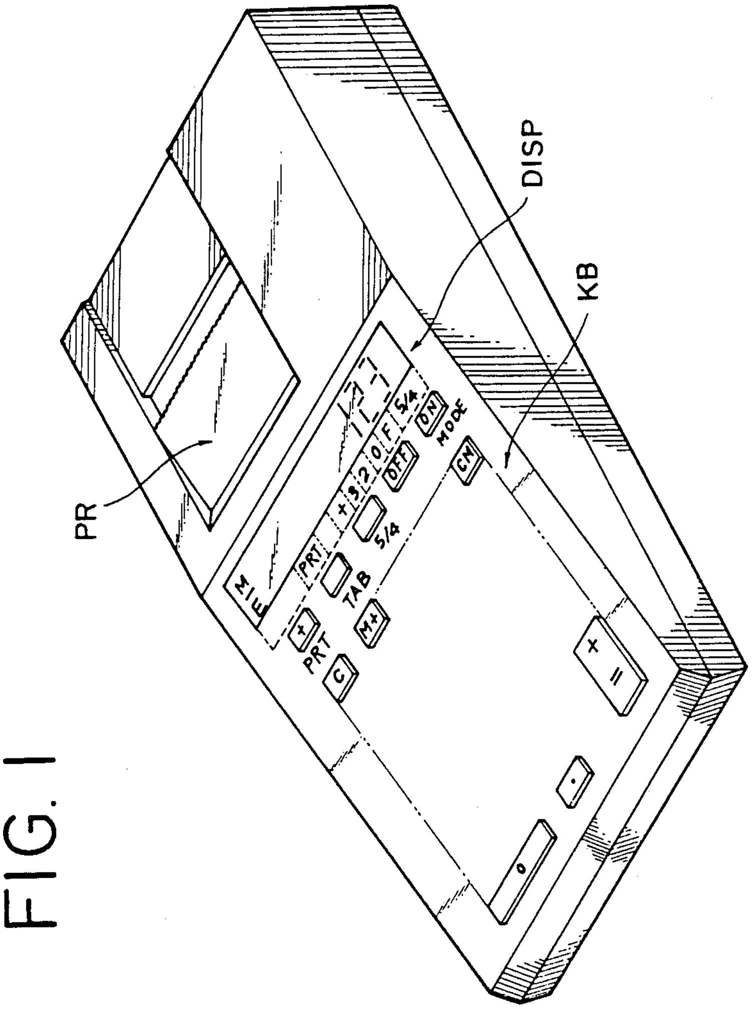
FIG. 1 is a perspective view showing an electronic desk-top printer-calculator in an embodiment of the present invention.

FIG. 1 is a perspective view of an embodiment of an electronic desk-top printer-calculator according to the present invention. In FIG. 1, KB denotes a keyboard having numeric keys and function keys. DISP denotes a display unit for displaying operating modes relating to this embodiment (to be described in detail later) in addition to numeric data and calculation results, and PR a printer unit for print output.

Figure 2A:
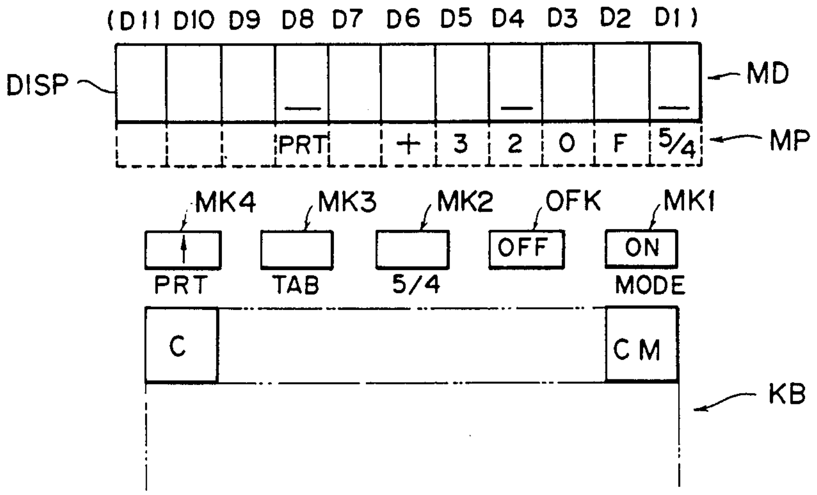
FIGS. 2A and 2B are enlarged views showing a keyboard portion and a display unit of the embodiment.
Figure 2B:
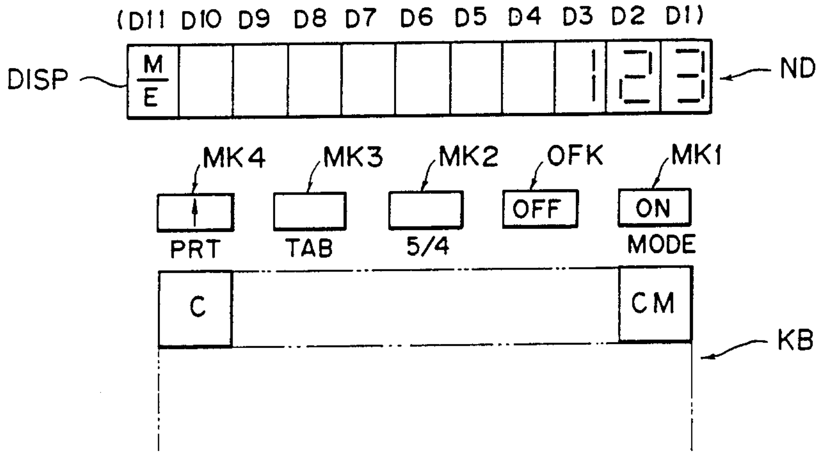

FIGS. 2A and 2B show a portion of the keyboard KB and the display unit DISP shown in FIG. 1. Here, MKl denotes a mode display specifying key for selecting a display condition on the display unit DISP. This mode display specifying key MKl also functions as an electrical power on key for setting this calculator in an operating condition.

MK2, MK3 and MK4 denote a round off to nearest whole number specifying key, a decimal point position (TAB) specifying key and a paper feed/print mode specifying key for specifying paper feed or print mode for the print unit PR, respectively.

OFK denotes an OFF key, which is generally disposed on a regular electronic desk-top calculator using CMOS LSI.

MP denotes a mode pattern indicated according to each digit position in the display unit DISP. (5/4) is written in the first digit position, (F) in the second digit position, (0) in the third digit position, (2) in the fourth digit position, (3) in the fifth digit position, (+) in the sixth digit position and (PRT) in the seventh digit position.

In FIG. 2A, the display unit DISP is in a display mode MD where the display unit DISP is used as an operating mode display unit. Here, in the first digit position (Dl) only the d segment, which is a horizontal display segment in the lowest position as shown in FIG. 4 of the seven segments is displayed, thereby indicating that the switch for rounding off to the nearest whole number is "on". Furthermore, the d segments are also displayed in the fourth digit position (D4) and the eighth digit position (D8), respectively, thereby specifying that "2" digits after the decimal point (TAB) are displayed and also that the print mode is specified.

In FIG. 2B, the display unit DISP is in a display mode ND where the display unit DISP is used as a numeric display unit. That is, this display manner is the usual display manner for an electronic desk-top calculator, and displays inputted numeric data and calculation results.

Switching between the above-mentioned two display manners MD (mode display) and ND (numeric display) can be performed by pressing the mode display specifying key MKl. Further, the initial setting when the power supply is turned on is for the MD (mode display) display manner (further details will be explained with reference to FIG. 4).

Figure 3:
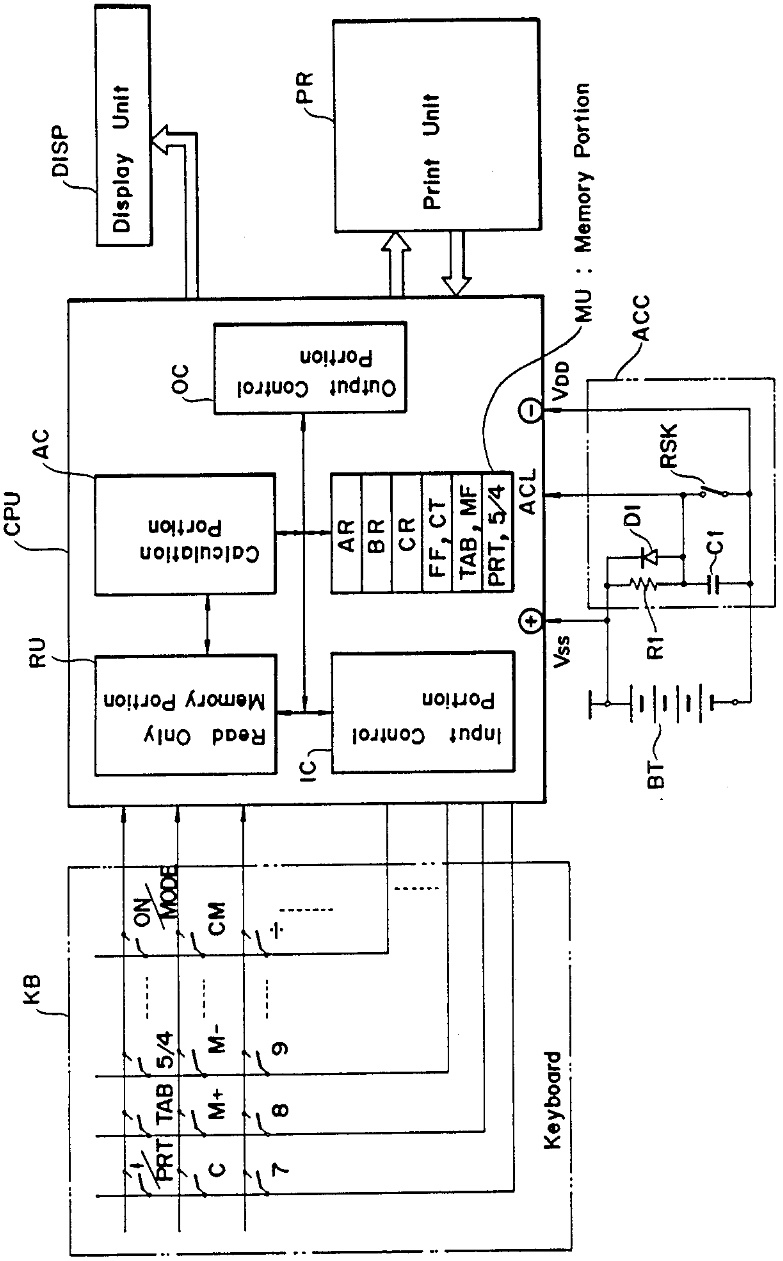
FIG. 3 is a block diagram showing an electrical arrangement of the embodiment.

FIG. 3 is a block diagram showing the overall electrical arrangement of the present embodiment. In FIG. 3, the keyboard portion KB has keys for specifying numbers and functions and key groups including the mode display specifying key MKl, the rounding off to the nearest whole number key MK2 and so on described above.

CPU denotes a central processing unit arranged in a single LSI chip which has the following elements.

First, there is provided a memory portion MU for storing information inputted from the keyboard portion KB. This memory portion has registers (AR, BR, CR) for storing numeric data and flag groups (FF) for storing flag data, as well as storage portions (TAB, MF, PRT, 5/4) for storing various mode manners and counters CT for performing mode display only for a predetermined time as described later. The register AR can also be used as a display register, and the contents of the register AR can be displayed on the display unit DISP. These components can be formed by a usual RAM (random access memory).

A calculation portion AC is arranged by various adders and judgement circuits in order to perform calculation processing on numeric data and operating mode specifying data stored in the above-mentioned registers.

Furthermore, in addition to the calculation portion AC and the memory portion MU, the central processing unit CPU has a read only memory portion RU for storing data for controlling an input control portion IC and an output control portion OC to be described later, and data for controlling various processings corresponding to the operating modes. This read only memory portion RU can be formed by a conventional read only memory (ROM) and an instruction decoder.

The above-mentioned input control portion IC outputs a key scanning signal to the keyboard KB according to an instruction from the fixed memory portion RU. When the keyboard KB receives that signal, it distinguishes the numeric key or function key which has been pressed, and also distinguishes the mode specified by any of the keys MK1–MK4.

The above-mentioned output control portion OC decodes the contents of the register AR in which the input data and the calculation result data are loaded by a segment decoder (not shown), and then outputs the decoded data to the display unit DISP for display, or controls the printing unit PR to print the contents of the register AR.

The display unit DISP contains a numeric display unit having fluorescent display tubes or light emitting diodes.

BT denotes an electrical power supply portion having batteries (or one battery) for driving the calculator.

ACC denotes a power on detection portion having a resistor Rl and a capacitor Cl connected in series between the battery and a diode Dl connected across the resistor Rl as shown in FIG. 3. This arrangement maintains an ACL terminal of the central processing unit CPU at Vss level for a predetermined time when the batteries are inserted into the calculator to inform the central processing unit CPU that the power supply is enabled.

A reset key RSK is connected across the capacitor Cl to reset all the portions of the central processing unit CPU and the display unit DISP by forcibly setting the potential at the ACL terminal to the same level as that when the power is supplied.

Figure 5A:
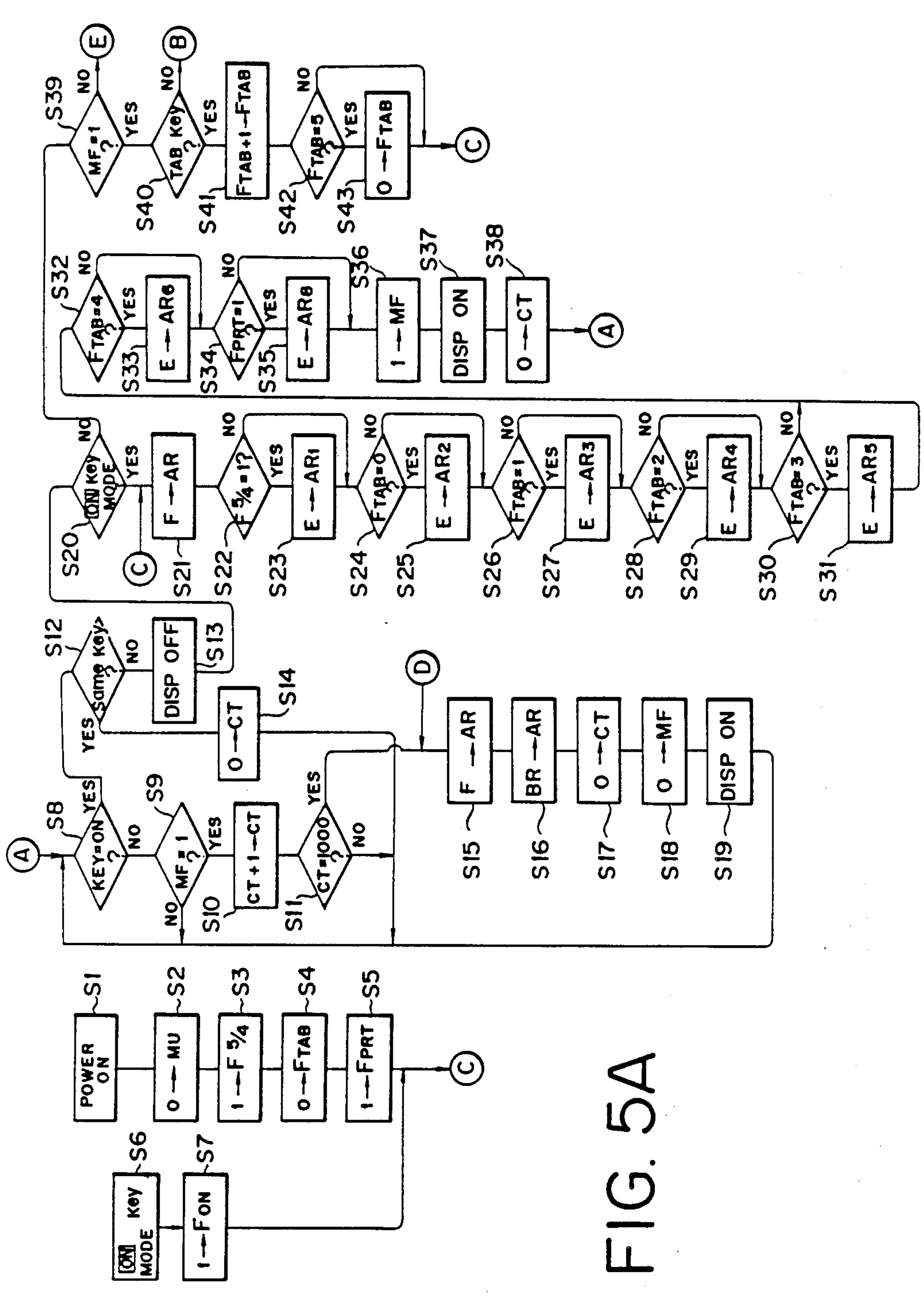
FIGS. 5A and 5B are flowcharts showing a control procedure in the embodiment.
Figure 5B:
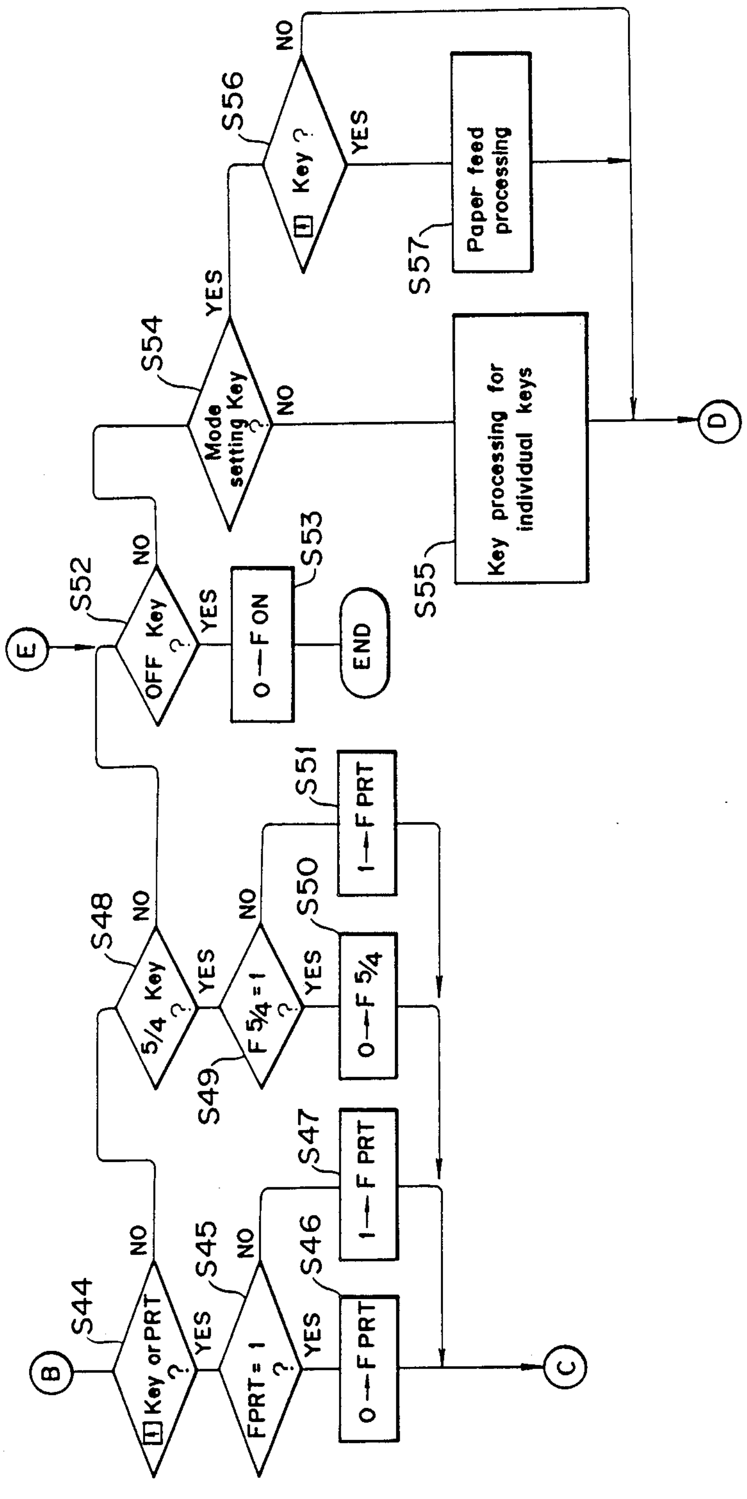

The central processing unit CPU is controlled by the programs stored in the memory RU, one example c,f which is shown in FIGS. 5A and 5B. An explanation of the operation of the embodiment described above will be made with reference to the table of display conditions shown in FIG. 4 and the flowcharts in FIGS. 5A and 5B.

1. POWER ON DISPLAY PROCEDURE

First, when batteries are inserted into the electrical power supply portion BT shown in FIG. 3, or when the reset key RSK is pressed and the predetermined signal is detected at the ACL terminal, the processing shown in FIGS. 5A and 5B starts from the auto-clear processing address (normally set at address 0) in the read only memory portion RU in the central processing unit CPU, so that the processing in step Sl shown in FIG. 5A is executed.

When the supply of the electrical power is detected at step Sl, the instruction of loading 0 to the memory unit MU is executed at next step S2, so that all the content of the memory portion MU is cleared to zero.

Next, at step S3, the flag $F_5/4$ for recording the round off to the nearest whole number mode is set to "1", so that the condition for rounding off processing is set.

At step S4, FTAB (arranged in four bits) is set to "0" to store F (floating) mode. FTAB is used as a TAB counter for storing the decimal point position specifying condition and counts from 0 to 4 to store the five data F, 0, 2, 3 and +specified by the decimal point position specifying key MK3.

At step S5, the print control mode condition is recorded by setting the print control mode flag FPRT to "1". Then, the processing jumps to the routine C beginning at step S21 to perform the processing for executing the mode display.

First, at step S21, the blanking code "F" is loaded into the display register AR to prevent display of all the digits stored in the display register AR (FIG. 3).

Next, the content of the flag $F_{5/4}$ is judged at step S22. Here, the flag $F_{5/4}$ is set to 1 at step S3, so that the processing enters step S23 from step S22.

At step S23, a data code "E" is transferred to the first digit in the register AR. With the "E" code in the register AR, the segment decoder in the output controller portion OC will only drive the d segment of the seven segments in the display unit DISP. The technology for executing this function is a conventional technology, and no detailed explanation will be given thereof. By changing output code from the above-mentioned decoder, A segment other than the d segment may be displayed.

At step S24, the central processing unit CPU judges whether or not the TAB counter FTAB is "0". Here, FTAB was reset to "0" at step S4, so that step S24 produces an affirmative result, and the processing enters step S25. That is, the "E" code is transferred to the second digit of the register AR.

The following steps S26, S28, S30 and S32 judge whether or not the TAB counter is 1, 2, 3 and 4, respectively. In this case, the results in all cases are negative (NO), so that steps S27, S29, S31 and S33 are not executed.

Subsequently, at step S34, the processing judges whether or not "FPRT=1". Here, FPRT was set to "1" at step S5, so that the result is affirmative (YES) and the "E" code is transferred to the eighth digit in the register AR at step S35. Consequently, the contents stored in the register AR are "FFFEFFFFFEE", having the "E" code in the first, second and eighth digits.

At step S36, the mode flag MF (FIG. 3) is set to "1", so that the mode display condition is set to "1".

At step S37, the "DISP ON" instruction is outputted to the output control portion OC, so that the data in the register AR is decoded. In the display unit DISP, the d segments of the first, second and eighth digits are displayed as in step No. 1 in the display condition table shown in FIG. 4. This indicates that the rounding off to the nearest whole number mode is selected as the present mode, while the position of the decimal point (TAB) is in the F (floating) mode and the printing mode (PRT) is in the print ON mode.

At step S38, the counter CT for displaying the mode display condition only for a predetermined period of time is cleared to zero. Next, the processing jumps to the A routine in which key operations are detected.

The first step of the A routine, i.e., step S8, executes to determine whether or not any key is pressed. When none of the keys is pressed, the processing goes to step S9 to judge whether or not the mode flag MF is 1. Here, the mode display condition is set, and the mode flag MF is set to 1, so that the processing moves to step S10 where the contents of the counter CT is incremented by one. Here, the counter CT has been reset to zero, so that zero is incremented by one to obtain one.

At the next step Sll, the processing judges whether or not "CT=1000". When the content of the counter CT is not 1000, the processing repeats the routine from step S8 -- step S9 -- step S10 -- step S11 -- step S8 -- step 9... until the counter CT reaches 1000. The hardware is arranged so that this loop requires approximately 5 msec to be executed once, so that when no key is pressed for five seconds (1000×5 msec), the counter CT reaches 1000 and the answer to the judgement at step Sll is affirmative (YES). Then, the processing jumps to the regular display condition processing routine (D routine).

At the first step of the D routine, i.e., step S15, the blanking code "F" is loaded into the register AR.

At next step S16, the data in the register BR is transferred to the register AR. Here, the register BR has been reset to zero, so that the "0" code in the first digit is transferred to the first digit in the register AR.

Subsequently, at step S17, the counter CT is cleared to zero.

At step S18, the mode flag MF is reset. Consequently, the mode display condition is reset and then at next step S19 the "DISP ON" instruction instructs the data in the register AR to be displayed on the display unit DISP (refer to step No. 2 shown in FIG. 4). In this manner, "0."is displayed on the display unit DISP.

In this manner, the "mode display condition" is maintained for approximately five seconds immediately after the power is turned on. Thereafter, the unit returns automatically to the "regular display condition". The time during which this mode display condition is maintained can be further shortened by setting the number of judgements in step Sll to "500", or extended by setting this number to "2000". In other words, any desired time period for mode display condition can be set.

After this procedure, the processing jumps to the A routine. That is, at step S8, a judgement is made whether or not any key has been pressed, and at step S9 the content of the mode flag MF is judged. This time, the mode display condition is not in effect, and the mode flag MF has been reset, so that the answer is "NO", and the processing in the A routine is executed again. In this way, the processings in steps S8 and S9 are repeated until some key is pressed, and "0." is kept displayed.

2. MODE DISPLAY PROCEDURE

Next, the situation will be described when the mode display specifying key MKl is pressed. Further, the key MKl also functions as the power on key which activates the central processing unit CPU.

First, the pressing of the key is detected at step S8, and then at step S12, a judgement is made whether or not the key pressed is the same as that which was pressed previously. In this case, since this is the first key to be pressed, the processing enters step S13 and at step S13 the display unit DISP is disabled.

At step S20, a judgement is made whether or not the key is the mode display specifying key MKl. In this case, the affirmative judgement "YES" is made, so that the mode condition display processing routine (C routine) is executed. That is, the processing executes step S21 --step S22 -- step S23 -- step S24 -- step S25 -- step S26 --step S28 -- step S30 --step S32 -- step S34 -- step S35 --step S36 -- step S37 --step S38 -- A routine, so that the mode display condition of step No. 3 shown in FIG. 4 is obtained.

3. PRINT MODE DISPLAY PROCEDURE

Next, an explanation will be made of the processing when the paper feed/print mode specifying key MK4 is pressed. This key is used both as a paper feed key for instructing feeding of paper in the print unit PR and as a print key for instructing the print mode.

First, the pressing of the key MK4 is detected at step S8 of the routine A, and then, at step S12, a judgement is made whether or not the key is the same as that pressed previously. When a negative judgement "NO" is made at step S12, the display is disabled at step S13.

Next, at step S20 a judgement is made whether or not the key is the mode display specifying key MKl. Here, the pressed key is not the key MKl, so that the processing proceeds to step S39. A further judgement is made at step S39 whether or not the mode display condition is in effect. Here, MF=1 indicating that the mode display condition is in effect, so the answer is affirmative (YES), and at step S40, a judgement is made whether or not the key is the decimal point position specifying key MK3. Here, a negative judgement is made (NO), so that the control moves to the B routine shown in FIG. 5B.

At step S44, a judgement is made whether or not the pressed key is the paper feed/print mode specifying key MK4 with an affirmative result "YES", and then at step S45, a judgement is made whether or not the print flag $F_{PRT}$ is "1". Here, the print on condition is in effect, so that $F_{PRT}$ is set to 1, and an affirmative answer "YES" is obtained. At step S46, $F_{PRT}$ is reset to "0".

If the print flag $F_{PRT}$ is "0", the processing moves from step S45 to step S47, and $F_{PRT}$ is set to "1". Next, the processing jumps to the mode condition display processing routine (C routine), and the display processing is executed in the same manner as the previous display processing. That is, the processing proceeds in the order of step S21 -- step S22 -- step S23 -- step S24 -- step S25 -- step S26 -- step S28 -- step S30 -- step S32. At step S34, the judgement is made whether or not "$F_{PRT}=1$". Here, $F_{PRT}$ has already been reset to "0", so that step S35 is not executed. Consequently, the blank code stored in the eighth digit of the register AR remains unchanged.

Thereafter, the processing proceeds in the order of step S36 -- step S37 -- step S38 -- A routine. As shown in step No. 4 of FIG. 4, the d segment in the eighth digit indicating the print mode is turned off. In this manner, if the paper feed/print mode specifying key MK4 is pressed under the mode display condition, the print mode can be changed.

4. DECIMAL POINT POSITION DISPLAY PROCEDURE

Next, an explanation will be made of the operation when the decimal point position specifying key MK3 is pressed.

When this decimal point position specifying key MK3 (hereinafter referred to as the TAB key) is pressed, execution is performed in the order of step S8 -- step S12 --step S13 -- step S20 -- step S39 -- step S40 in the same manner as previous processing. At step S40, a judgement is made whether or not the key pressed is the TAB key with an affirmative answer "YES", so that the operation "$F_{TAB}+1=F_{TAB}$" is executed at step S41. That is, the four-bit FTAB flag is incremented by one, and the content of the flag $F_{TAB}$ changes from zero to 1.

Next,-a step S42, a judgement is made whether or not $F_{TAB}$ is set to 5, and if the answer is affirmative "YES", the content of $F_{TAB}$ is reset to zero. Here, $F_{TAB}$ is zero, so that the answer is negative "NO", and the processing jumps to the mode condition display processing routine (C routine) to execute the display processing in the same manner as previous processing. That is, the processing proceeds in the order of step S21 -- step S22 -step S23 --step S24.

At step S24, the content of $F_{TAB}$ is one, so that the answer is negative "NO", so that the processing moves to step S26 and the result at next step S26 is an affirmative judgement "YES". At step S27, the "E" code is loaded into the eighth digit of the register AR.

Thereafter, the processing proceeds in the order of step S28 -- step S30 -- step S32 -- step S34 -- step S36 -step S37 -- step S38 -- A routine. As shown in step No. 5 shown in FIG. 4, the d segments in the first and third digits are displayed. This indicates that the mode for rounding off to the nearest whole number is specified, and that the "0" mode is specified. This "0" mode means that a number is diplayed down to the decimal point. In this manner, it is possible to change the setting for the position of the decimal point from "F" to "0".

5. CHANGE OF MODE CONDITION

Next, when the TAB key is pressed again, the A routine is executed in the same manner as mentioned above. That is, the processing executes in the order of step S8 -step S12 -- step S13 -- step S20 -- step S39 -- step S40 -step S41 -- step S42 -- C routine. As a result, the flag $F_{TAB}$ is set to "2" and in the C routine, step S21 --step S22 --step S23 -- step S24 -- step S26 -- step S28 --step S29 are executed. Thus, the "E" code is transferred to the fourth digit of the register AR.

Subsequently, the processing executes in the order of step S30 -- step S32 -- step S34 -- step S36 -step S37 -- step S38 -- A routine. As shown in step No. 6 of FIG. 4, only the d segments in the first and fourth digits are displayed. This indicates that the number of digits to be displayed after the decimal point has been changed from "0" to "2". In this manner, by pressing the TAB key while the mode display condition is in effect, it is possible to change the mode condition.

6. NO KEY PROCEDURE

When no key is pressed for approximately five seconds after that, as already explained and as shown in step No. 7 of FIG. 4, the display unit DISP changes from the mode display condition to the regular display condition.

7. OFF KEY PROCEDURE

Next, when the OFF key OFK is pressed (refer to step No. 8 shown in FIG. 4), a flip-flop FON for instructing an operation enabling (on) condition is reset to "0" (step S53). This flip-flop FON controls the on/off of a clock generator circuit (not shown) inside the LSI of the central processing unit CPU. When the flip-flop FON is reset, clock generation is interrupted, so that electrical power consumption is saved. Even when the clock generation is interrupted, however, the memory portion MU is kept connected to the electrical power supply, so that the stored data is not deleted.

That is, when this OFF key OFK is pressed, the processing proceeds in the order of step S8 -- step S12 -step S13 -- step S20 -- step S39 -- step S52, and a judgement is made whether or not the key pressed is the OFF key OFK. Next, at step S53, the flip-flop FON is set to "0" and as shown in step No. 8 of FIG. 4, the display goes out.

8. MODE CONDITION DISPLAY PROCEDURE

An explanation will be made now of the situation where the ON key, i.e., the MKl key, is pressed.

When the pressing of the ON key MKl is detected at step S6, the flip-flop FON is set to "1" at step S7. This initiates the clock generation by the clock generator circuit (not shown), and the following C routine processing is executed.

The C routine is the mode condition display processing routine. Here, the mode data remain stored in the memory portion MU. In the C routine, the following steps are executed in the same manner as described above: step S21 --step S22 --step S23 -- step S24 -- step S26 -step S28 --step S29 -- step S30 -- step S32 -- step S34 -step S36 --step S37 -- step S38. The mode display as shown in step No. 9 of FIG. 4 is thereby performed.

9. MAINTAINING MODE DISPLAY

Next, an explanation will be made of the operation when the paper feed/print mode specifying key MK4 is kept pressed under the mode display condition.

First, the pressing of the key is detected at step S8 of the A routine. The execution of step S12 --step S13 -- step S20 -- step S39 -- step S40 -- step S44 --step S45 -- step S47 sets the flag $F_{PRT}$ to "1".

After that the flag $F_{PRT}$ is set to "1", in the C routine, the execution of step S21 -- step S22 -- step S23 --step S24 -- step S26 -- step S28 -- step S29 -- step S30 --step S32 -- step S34 -- step S35 is performed, and the "E" code is transferred to the eighth digit of the register AR.

Next, the processing executes step S36 -- step S37 -- step S38 -- A routine, so that the mode display is performed as shown in step No. 10 of FIG. 4. When the paper feed/print mode specifying key MK4 is continuously pressed, an affirmative result is obtained at step S8 of the A routine, so that the processing proceeds to step S12 where a judgement is made whether or not the key being pressed is the same as that pressed previously. This naturally produces an affirmative result (YES) in this case, so that at step S14 the counter CT is reset to "0". After this reset, the processing returns to the A routine and the instruction in step S8 is executed.

In this manner, the routine of step S8 -- step S12 -- step S14 is repeated while the paper feed/print mode specifying key MK4 is being pressed, and accordingly the mode display condition is maintained.

In the meantime, when the paper feed/print mode specifying key MK4 is released, step S8 -- step S9 -- step S10 -- step S11 of the A routine are repeated, and the counter CT counts from 0 to 1000. Then, step S15 -- step S16 -- step S17 -- step S18 -- step S19 of the D routine are executed, so that the display unit DISP returns to the regular display condition approximately five seconds after the paper feed/print mode specifying key MK4 is released.

10. CLEARING OF MODE DISPLAY

Next, an explanation will be made of the operation when a key other than the mode specifying key, for instance, the numeric key "5", is pressed under the mode display condition where the content of the mode condition counter CT is less than 1000.

First, when the numeric key "5" is pressed, a key pressing is detected at step S8 of the A routine. Following this detection step, step S12 -- step S13 -- step S20 -- step S39 are executed. At this time, the mode display condition is in effect, so the processing proceeds in the order of step S40 -- step S44 -- step S48 -- step S52 -- step S54 --step S55. At step S56, the processing for loading "5" in the register BR is executed. This is a conventional technology, and so a detailed explanation will be omitted.

After that, the processing jumps to the regular display routine (D routine), and step S15 -- step S16 -step S17 -- step S18 -- step S19 are executed. This results in that the data "5" stored in the register BR is displayed, and the mode display condition is cleared. As shown in step No. 11 of FIG. 4, when a key other than the mode setting key is pressed under the mode display condition, that key data is inputted, and the mode display condition instantaneously changes to the regular display condition.

11. MODE DISPLAY NULLIFICATION

Next, an explanation will be made of the operation when the mode setting keys MK2, MK3 and MK4 are pressed under the regular display condition.

First, when the paper feed/print mode specifying key MK4 is pressed, the processing in the A routine is executed. That is, step S8 -- step S12 -- step S13 -- step S20 -- step S39 are executed. At this time, the mode display condition is not in effect, so that the judgement result at step S39 is negative "NO", and consequently the E routine processing is executed.

First, a judgement is made at step S52 whether or not the key pressed is the OFF key with a negative result "NO". At step S54, a judgement is made whether or not the key being pressed now is a mode setting key, with an affirmative result "YES". Then, at step S56, a judgement is made whether or not the key is the paper feed/print mode specifying key MK4, with an affirmative result "YES". Consequently, at step S57, the print unit paper feed processing instruction is outputted to the output control portion to feed the recording paper.

In this manner, in the regular display condition, the paper feed/print mode specifying key MK4 operates as a paper feed key and does not function as a print mode specifying key.

Thereafter, the processing jumps to the regular display processing routine (D routine), and the processing of step S15 -- step S16 -- step S17 -- step S18 -- step S19 is executed. As a result, the display shown in step No. 12 of FIG. 4 is performed, and at the same time the paper feed processing is executed, but the print mode does not change.

In the same manner, when the TAB key MK3 or the rounding off to the nearest whole number key MK2 are pressed, the regular display processing of step S8 -- step S12 -- step S13 -- step S20 -- step S39 -- step S52 -- step S54 -- step S56 -- D routine is executed. Consequently, neither the contents of the flag $F_{TAB}$ nor the condition of the flag $F_{5/4}$ change, resulting in a non-operation of mode display.

12. MODE CONFIRMATION DISPLAY

This non-operation can be confirmed by pressing the mode display specifying key MKl. That is, when the mode display specifying key MKl is pressed, the processing of step S8 --step S12 -- step S13 -- step S20 -- step S21 --step S22 --step S23 -- step S24 -- step S26 -- step S28 -step S29 --step S30 -- step S32 -- step S34 -- step S35 -step S36 --step S37 -- step S38 -- A routine is executed, so that the display shown in step No. 15 of FIG. 4 is obtained. This display is the same as the display in step No. 10 of FIG. 4. In this manner, this display confirms the fact that the specified modes have not changed.

Further, while in this embodiment, only the d segment of the seven segments was displayed to perform the mode display, it is also possible to display other single or plural segments, or to use the decimal point display element or other function display elements.

Moreover, while the above explanation has related to an electronic desk-top calculator, the present invention can also be applied to various types of electronic apparatus such as word-processors and electronic typewriters which satisfy various functions in response to a plurality of operating modes.

The following advantages can be obtained when the present invention is applied to an electronic desk-top calculator as described above.

(i) A mode display specifying key also functions as an ON key for activating a central processing unit, when the central processing unit is not energized (off), and can be made to operate as a mode display specifying key for setting a display condition of a display unit to a mode display condition when the central processing unit is energized (on).

(ii) The mode display specifying and ON key described above reduces the number of keys in comparison with conventional units, leading to provide a low-cost and convenient electronic desk-top calculator.

(iii) By using a segmental display element and displaying only at least one segment such as a d segment of, for instance, seven segments, mode display can be performed.

(iv) When the ON key or the reset key is pressed, the display unit is automatically set to the mode display format without requiring to press the mode display specifying key, so that the key operation for confirming the mode is eliminated.

(v) When a desired time has passed after a mode setting key such as a rounding off to the nearest whole number specifying key or a decimal point position specifying key is pressed, the mode display condition can be returned automatically to the regular display condition.

(vi) When a key other than a mode setting key is pressed under the mode display condition, the content of the pressed key can be executed and the display can be returned to the regular display.

(vii) Under the regular display condition, even if a mode setting key is pressed erroneously, it is possible to nullify that mode setting operation, thereby providing an electronic desk-top calculator having greater convenience than conventional units.

(viii) For instance, a paper feed key and a print mode specifying key can be used jointly, and when this key is pressed under the regular display condition, this key can function as a paper feed key, and when this key is pressed while the mode condition is displayed, the key can function as a print mode specifying key. Furthermore, it is also possible to use jointly other mode setting keys (for instance, a TAB mode key) and keys other than mode setting keys (for instance, numeric keys and function keys).

(ix) All mode setting keys can be subjected to such a joint use, so that it is possible to provide a compact, inexpensive electronic desk-top calculator which has less keys than a conventional unit.

As explained above, according to the present invention, a single display unit can be used to selectively serve as one of a mode display and a regular display, so that a low-cost electronic apparatus using a general-purpose display unit can be provided.

Furthermore, this invention allows a sole mode setting key to have plural functions, so as to provide a compact size for the main unit, as well as making it possible to provide an electronic apparatus having a keyboard which can be operated easily by a user.

What is claimed is:

1. An electronic apparatus having a plurality of operating modes, comprising:

a display means having a plurality of display digits, each of said dispaly digits having a set of a plurality of display segments, of which a predetermined display segments are driven to display a predetermined numeral;

mode selecting means for selecting either one of an operating mode display format by which said display means displays one of said plurality of operating modes in the form of a sign expressed by one of said plurality of display segments and the remaining display format by which said display means displays a numeral;

display format setting means responsive to an output from said mode selecting means for setting a display format of said display means to a display format selected by said mode selecting means; and mode pattern means for indicating fixedly said plurality of operating modes at predetermined locations related to said plurality of display digits, respectively, so that when said operating mode display format is selected, at least one said sign is displayed at at least one position of at least one of said display digits corresponding to at least one of said plurality of operating modes indicated by said mode pattern means without displaying a numeral in the remaining display digits.

2. An electronic apparatus as claimed in claim 1, wherein said display means has seven segmental display elements and displays at least one predetermined segment of said display elements when said operating mode display format has been selected by said mode selecting means.

3. An electronic apparatus as claimed in claim 2, wherein said mode selecting means has a mode selecting key, and which further comprises means for controlling said display format setting means to interrupt said operating mode display format when a key other than said mode selecting key is pressed while said operating mode is being displayed.

4. An electronic apparatus as claimed in claim 3, wherein said mode selecting means comprises means for nullifying the pressing of said mode selecting key at a time other than a time that said display means is displaying the operating mode selected by said operating mode format.

5. An electronic apparatus as claimed in claim 4, which includes an electric power supply and wherein said mode selecting key also functions as an electric power supply ON key, said electronic apparatus further comprising means for using the output from said electric power supply ON key as a mode selecting key output only after said electric power supply has been turned on.

6. An electronic apparatus as claimed in claim 1 which further comprises means for controlling said displaying means to clear the content of an operating mode displayed on said display means after the elapse of a predetermined time and for changing the format of said operating mode displayed by said display means to the remaining display format.

7. An electronic apparatus having a plurality of operating modes, comprising:

a display means having a plurality of display digits, each of said display digits having a set of a plurality of display segments, of which a predetermined display segment or segments are driven to display a predetermined numeral;

switching means for switching said display means between an operating mode display format by which said display means displays one of said plurality of operating modes in the form of a sign expressed by one of said plurality of display segments and the remaining display format by which said display means displays a numeral;

display format setting means responsive to an output from said switching means for setting a display format of said display means to a display format selected by said switching means;

mode pattern means for indicating fixedly said plurality of operating modes at predetermined locations related to said plurality of display digits, respectively, so that when said operating mode display format is selected, at least one said sign is displayed at at least one position of at least one of said display digits corresponding to at least one of said plurality of operating modes indicated by said mode pattern means without displaying a numeral in the remaining display digits; and detecting means for detecting when a power supply is turned on or when said display means is reset, said display format setting means being responsive to an output from said detecting means for controlling said display means to set forcibly a display format of said display means to said operating mode display format.

8. An electronic apparatus as claimed in claim 7, wherein said switching means comprises means for automatically switching to said remaining display format from said operating mode display format after said operating mode is displayed according to said operating mode display format for a predetermined period of time.

9. An electronic apparatus as claimed in claim 8, wherein said control means has a mode setting key, and which further comprises means responsive to the pressing of said mode setting key only when an operating mode display format is displayed on said display means, said mode setting key setting said electronic apparatus to a specified operating mode condition.

10. An electronic apparatus comprising:

a display means having a plurality of display digits, each of said display digits having a set of a plurality of display segments, of which a predetermined display segment or segments are driven to display a predetermined numeral;

mode selecting means for selecting either one of an operating mode display format by which said display means displays one of a plurality of operating modes in the form of a sign expressed by one of said plurality of display segments and the remainining display format by which said display means displays a numeral;

an operating mode setting key for setting a specific operating mode;

function providing means for providing said operating mode setting key with a function other than a function of setting said operating mode when said operating mode setting key is energized;

display format setting means responsive to an output from said mode selecting means for setting a display format of said display means to a display format selected by said mode selecting means; and mode pattern means for indicating fixedly said plurality of operating modes at predetermined locations related to said plurality of display digits, respectively, so that when said operating mode display format is selected, at least one said sign is displayed at at least one position of at least one of said display digits corresponding to at least one of said plurality of operating modes indicated by said mode pattern means without displaying a numeral in the remaining display digits.

11. An electronic apparatus as claimed in claim 10, wherein said operating mode setting key is a print mode specifying key and said function providing means has means for serving said print mode specifying key as a paper feed key when said operating mode is not designated,

12. An electronic apparatus having a plurality of operating modes, comprising:

a display means having a plurality of display digits, each of said display digits having a set of a plurality of display elements, of which a predetermined display element or elements are driven to display a predetermined numeral;

mode selecting means for selecting either one of an operating mode display format by which said display means displays one of said plurality of operating modes in the form of a sign expressed by one of said plurality of display elements and the remaining display format by which said display means displays a numeral;

display format setting means responsive to an output from said mode selecting means for setting a display format of said display means to a display format selected by said mode selecting means; and mode pattern means for indicating fixedly said plurality of operating modes at predetermined locations related to said plurality of display digits, respectively, so that when said operating mode display format is selected, at least one said sign is displayed at at least one position of at least one of said display digits corresponding to at least one of said plurality of operating modes indicated by said mode pattern means without displaying a numeral in the remaining display digits.

13. An electronic apparatus having a plurality of operating modes, comprising:

a display means having a plurality of display digits, each of said display digits having a set of a plurality of display elements, of which a predetermined display element or elements are driven to display a predetermined numeral;

switching means for switching said display means between an operating mode display format by which said display means displays one of said plurality of operating modes in the form of a sign expressed by one of said plurality of display elements and the remaining display format by which said display means displays a numeral;

display format setting means responsive to an output from said switching means for setting a display format of said display means to a display format selected by said switching means;

mode pattern means for indicating fixedly said plurality of operating modes at predetermined locations related to said plurality of display digits, respectively, so that when said operating mode display format is selected, at least one said sign is displayed at at least one position of at least one of said display digits corresponding to at least one of said plurality of operating modes indicated by said mode pattern means without displaying a numeral in the remaining display digits; and detecting means for detecting when a power supply is turned on or when said display means is reset, said display format setting means being responsive to an output from said detecting means for controlling said display means to set forcibly a display format of said display means to said operating mode display format.

14. An electronic apparatus comprising:

a display means having a plurality of display digits, each of said display digits having a set of a plurality of display elements, of which a predetermined display element or elements are driven to display a predetermined numeral;

mode selecting means for selecting either one of an operating mode display format by which said display means displays one of a plurality of operating modes in the form of a sign expressed by one of said plurality of display elements and the remaining display format by which said display means displays a numeral;

an operating mode setting key for setting a specific operating mode;

function providing means for providing said operating mode setting key with a function other than a function of setting said operating mode when said operating mode setting key is energized;

display format setting means responsive to an output from said mode selecting means for setting a display format of said display means to a display format selected by said mode selecting means; and mode pattern means for indicating fixedly said plurality of operating modes at predetermined locations related to said plurality of display digits, respectively, so that when said operating mode display format is selected, at least one said sign is displayed at at least one position of at least one of said display digits corresponding to at least one of said plurality of operating modes indicated by said mode pattern means without displaying a numeral in the remaining display digits.

* * * * *